Feb. 23, 1926.

R. C. LEAKE 1,574,491

TORQUE TESTING DEVICE FOR SEMAPHORE SIGNALS

Filed August 12, 1921   2 Sheets-Sheet 1

INVENTOR.
R. C. Leake
BY Neil D. Preston
his ATTORNEY.

Feb. 23, 1926.
R. C. LEAKE
TORQUE TESTING DEVICE FOR SEMAPHORE SIGNALS
Filed August 12, 1921
1,574,491
2 Sheets-Sheet 2
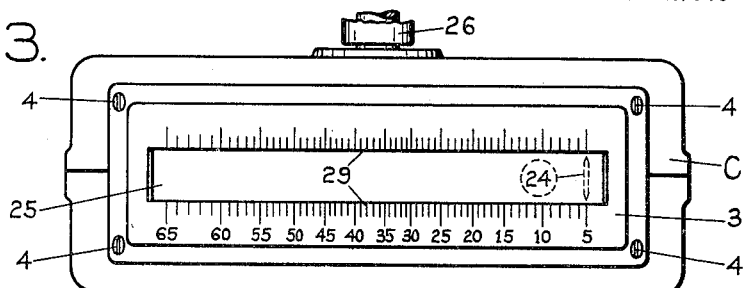
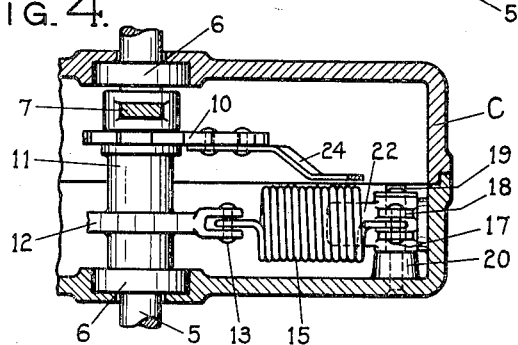
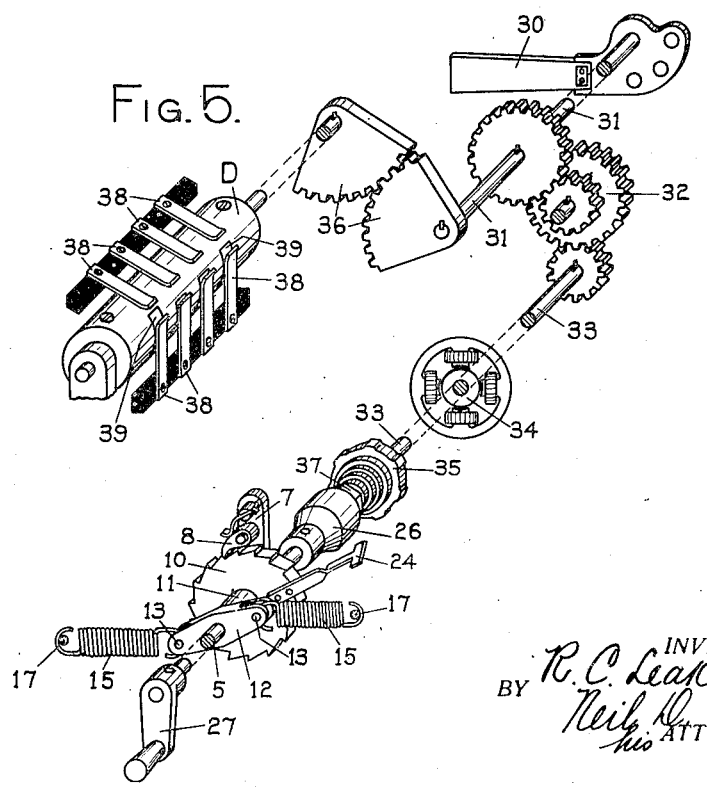

Patented Feb. 23, 1926.

1,574,491

UNITED STATES PATENT OFFICE.

RICHARD CHASE LEAKE, OF ROCHESTER, NEW YORK, ASSIGNOR TO GENERAL RAILWAY SIGNAL COMPANY, OF GATES, NEW YORK, A CORPORATION OF NEW YORK.

TORQUE-TESTING DEVICE FOR SEMAPHORE SIGNALS.

Application filed August 12, 1921. Serial No. 491,780.

*To all whom it may concern:*

Be it known that I, RICHARD CHASE LEAKE, a citizen of the United States of America, residing at Rochester, in the county of Monroe and State of New York, have invented certain new and useful Improvements in Torque-Testing Devices for Semaphore Signals, of which the following is a specification.

This invention relates to a portable torque testing device, and the method of using such device to determine the return torque of semaphore signals used in railway signaling systems.

In certain types of semaphore signal operating mechanisms, the semaphore blade in moving to its horizontal or stop position, has to drive the armature of the operating motor and the gearing connecting that motor to the blade. If there is excessive friction in the bearings of the motor or the connecting gearing, and more especially between the brushes and commutator of the motor, the effective return torque of the semaphore blade, due to the weight of the blade and its spectacle casting, is reduced, making it less certain that the semaphore blade will assume its horizontal stop position at the proper time. These conditions make it desirable to be able to determine from time to time whether or not there is excessive friction or binding of the parts which might tend to cause the semaphore to stay in a raised or intermediate position, and fail to move to its stop position.

In accordance with the present invention, the operating condition of the semaphore signal operating mechanism, and the amount of friction of its parts is determined by using a portable device to measure the torque exerted by the motor shaft while the semaphore blade is free to gravitate to its stop position. Among the objects of the present invention are to construct a simple, compact and light torque testing or measuring device, which is portable and can be easily applied to a semaphore signal operating mechanism, to measure its torque for either direction of rotation, and for any desired position of the semaphore blade. Other specific objects and advantages of the invention will appear as the description progresses.

Figure 1:
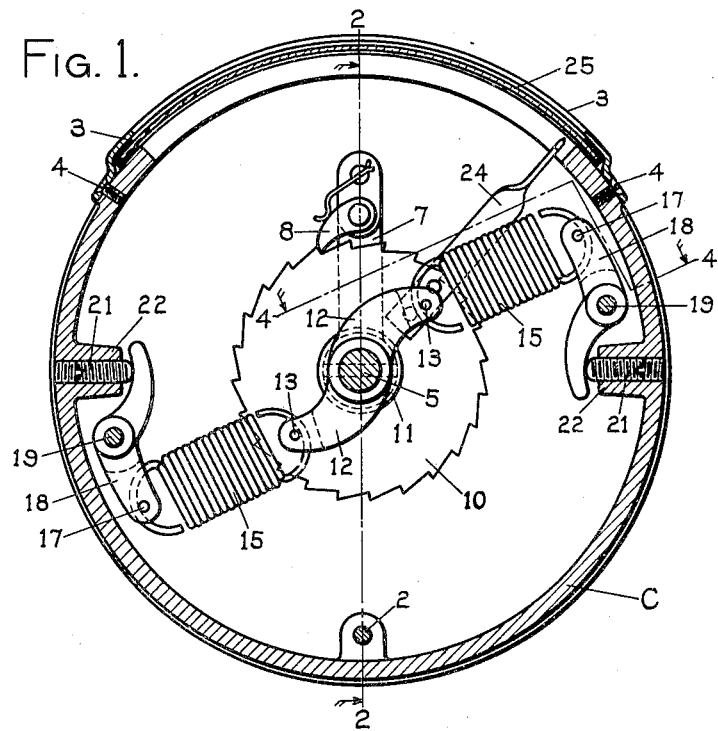
Figure 2:
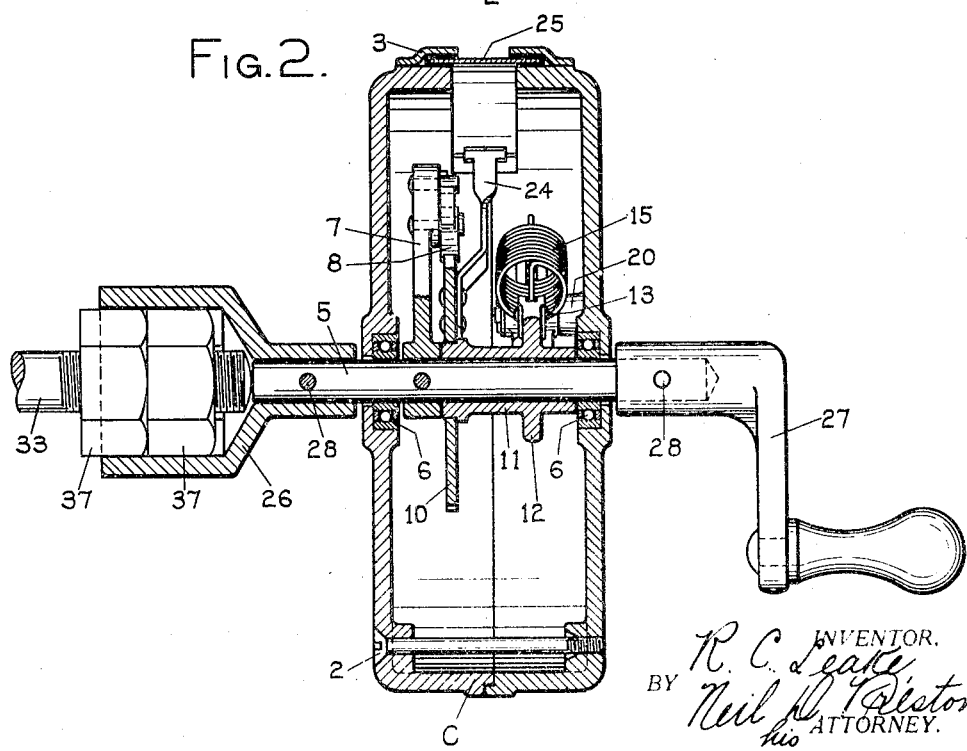

In describing the invention in detail reference will be made to the accompanying drawings, in which Fig. 1 is a section through the torque testing device embodying the invention, said section being taken at right angles to the main operating shaft of the device; Fig. 2 is another section through the device taken on a line 2—2 in Fig. 1, looking in the direction indicated by the arrows; Fig. 3 is an edge view of the device showing the pointer and scale; Fig. 4 is a fragmentary cross section taken on the line 4—4 in Fig. 1; and Fig. 5 is a diagrammatic view of the principal operating parts of a semaphore signal operating mechanism of well-known construction, and shows how the torque testing device is applied and used.

In the specific embodiment of the invention illustrated, the torque testing device comprises a cylindrical frame or casing C made up of two counterpart halves, having overlapping edges, which are fastened together at one side by a screw or bolt 2, and along another side by a scale plate 3 (see Fig. 3) secured to the two halves of the casing C at the corners by screws 4. A shaft 5 is journaled in this casing, preferably on ball bearings 6 fitted in recesses in the two halves of the casing, as shown in Fig. 2. An arm 7 is pinned or otherwise suitably fastened to the shaft 5, and carries at its outer end a spring pressed pawl 8. The pawl 8 cooperates with the teeth of a ratchet wheel 10 fixed to a sleeve 11 loosely mounted on the shaft 5. Integral with this sleeve 11 are curved arms 12, best shown in Fig. 1, and the outer ends of these arms are bifurcated and provided with cross pins 13 to be engaged by the hooked ends of tension springs 15. The other ends of said springs 15 are hooked about pins 17 fastened in the bifurcated ends of two anchoring levers 18, these levers being pivotally supported on pins 19 fixed in bosses 20 integral with one half of the casing C, as shown in Fig. 4. An adjusting screw 21 threaded in a boss 22 in this half of the casing engages the free arm of each anchoring lever 18, so that by turning these screws 21, the tension of the springs 15 may be varied.

A pointer 24 is fastened to the ratchet wheel 10 and sweeps across an indicating opening formed in the casing C, this opening being covered by a curved glass plate 25 held in place by the scale plate 3. The edges of the scale plate 3 are provided with calibrated graduations 29, as shown in Fig. 3.

To one of the projecting ends of the shaft is connected a socket member 26, and to the other end a crank or handle 27. This socket member 26 and the handle 27 are preferably detachably connected, as by a taper pin 28 as shown, so that they can be interchanged to permit measurement of torque exerted in either direction, in a manner more fully explained hereinafter. It is noted here that the socket member 26 is used for connecting the device to the motor shaft of the semaphore signal, and this socket member may take various forms depending upon the kind of driving connection that can best be established.

While the torque testing device shown and described, by suitable adaptation and modifications, may be made applicable to any type of semaphore signal operating mechanism, the particular construction illustrated has been designed for use in connection with a well-known make of semaphore signal, the principal operating parts of which are illustrated in a diagrammatic way in Fig. 5.

Referring to Fig. 5, the usual semaphore blade 30 and spectacle casting is fixed to the main shaft 31, which is connected by reduction gearing 32 to the motor shaft 33 driven by the armature 34 of a suitable electric motor shown conventionally. This motor shaft 33 is provided with a notched wheel 35 which cooperates with the usual mechanism (not shown) for holding the semaphore in its caution or clear position. The main shaft 31 is also connected by gear sectors 36 to the usual drum circuit controller D. In the particular semaphore signal operating mechanism illustrated, the end of the motor shaft 33 is provided with two nuts 37 which in practice form a part of the friction clutch connecting the notched wheel 35 to said motor shaft, and because of this fact, the socket member 26 of the torque testing device is shaped to fit over these nuts 37, thereby establishing a driving connection between the motor shaft 33 and the shaft 5 of the torque testing device.

*Operation.*—To determine the return torque of the semaphore 30, the socket member 26 is attached to one of the ends of the shaft 5, depending on which way the motor shaft 33 is driven by the semaphore 30 in its movement toward the stop position, and the handle 27 is fastened to the other end of the shaft 5. The socket 26 is then applied to the nuts 37 on the end of the motor shaft 33, and by turning the handle 27 the motor shaft 33 may be rotated to raise the semaphore 30 to any desired position, the pawl 8 clicking idly over the ratchet wheel 10. When the semaphore 30 has been raised to the position at which it is desired to determine its return torque, the handle 27 is released, while the casing C is held. The weight of the semaphore blade 30 and its spectacle casting tends to rotate the motor shaft 33, which in turn tends to rotate the shaft 5 and arm 7 of the device, the pawl 8 engaging the ratchet 10. While the casing C is held, such movement of the ratchet wheel 10 extends the springs 15, and the ratchet wheel 10 and pointer 24 carried thereby is thus shifted to the position where the tension of the springs 15 balances the torque exerted by the shaft. This torque is then read directly on the scale 29, which is calibrated with respect to the tension of the springs, variations in their effective lever arms, and the like, so that the scale 29 will give in foot pounds or other desired units the torque exerted by the shaft. Since the torque reading obtained in this way is that due to the difference in the downward torque of the blade 30 and spectacle casting and the opposing friction of the mechanism, it is possible to determine whether or not the parts are in good operating condition, or if there is excessive friction, by merely comparing the reading of the torque obtained with that which should be exerted when the signal is in proper working order.

It will be evident that the return torque can be measured for any desired position of the semaphore, by using the handle 27 to move the semaphore 30 to the desired position, and then releasing the handle. In this way, data for a complete torque curve of the mechanism in question may be obtained, and variations due to the spring fingers 38 of the controller D riding onto or off their respective contact segments 39, improper adjustment of the motor brushes, wear of the bearings, or other faults or peculiarities of that mechanism can be readily ascertained.

With the semaphore in a given position, the casing C may be rocked back and forth, thereby obtaining readings of torque corresponding to that required to raise a semaphore 30 and also that which the semaphore will exert, that is, the action of the torque due to the weight of semaphore and the spectacle casting, plus and minus the friction of the operating mechanism. The device may also be used for determining the starting torque of the motor by attaching the device to the motor shaft 33 in such a way that the springs 15 are tensioned when power is applied to the motor, the casing being held as before. Various other applications and uses of the device will be evident.

The shape and length of the curve arms, the length and strength of the springs, and the other parts, are preferably proportioned and selected so as to give a uniformly distributed scale marking. Different strengths of springs and different scales may, of course, be substituted as required for different signals, and since the socket member 26 and handle 27 are interchangeable, the device may be used to measure the return torque of signals operating to return the motor shaft 33 either clockwise or counter-clockwise. The torque device may be held in any position, with the scale 29 in the most convenient position.

Having now fully described one specific embodiment of my invention, I desire to have it understood that the construction and arrangement of parts is susceptible of change, and that my invention is not limited to the exact construction and arrangement shown.

What I claim is:—

1. In a torque testing device, in combination with a shaft adapted to be connected with the rotary element the torque of which is to be tested, a support having a scale and in which said shaft may turn, an indicator movable over said scale, and means including a spring for operatively connecting said shaft and indicator for driving movement in one direction with respect to said support.

2. In a torque testing device, in combination with a shaft adapted to have either of its ends connected with the shaft whose torque is to be tested, a support provided with a scale, an indicator fastened to said shaft and movable along said scale, arms radiating from said shaft, and springs connected between said arms and said support.

3. In a torque testing device, in combination with a shaft adapted to be connected with the device whose torque is to be tested, a support provided with a scale, a sleeve on said shaft provided with an indicator, springs connected between said sleeve and said support, and means for coupling said sleeve to said shaft for rotation therewith in one direction but not in the opposite direction.

4. In a torque testing device, in combination with a shaft, a detachable coupling member adapted to be attached to either end of said shaft for connecting it with the rotary element the torque of which is to be tested, a member supporting said shaft for rotation therein and provided with a scale, an indicator movable over said scale, means operatively connecting said shaft and indicator for driving movement in one direction, and spring means between said shaft and member opposing such movement of the indicator in said direction.

5. In a torque testing device, in combination with a shaft, a detachable coupling member on one end of said shaft, a detachable handle on the other end of said shaft, a support for said shaft provided with a scale, an indicator on said shaft movable along said scale, and springs connecting said shaft and said support to counteract the torque to be tested, said handle and coupling member being interchangeable so that either clockwise or counter-clockwise torque may be tested.

6. In a torque testing device, in combination with a shaft, a support for said shaft provided with a scale concentric with the shaft, an indicator on said shaft, and adjustable spring means connecting said shaft and said support to counteract the torque to be tested, said adjustable means permitting the scale to be turned to the top regardless of the angular disposition of said shaft.

7. In a torque testing device, in combination with a shaft, a support for said shaft provided with a scale concentric with the shaft, a sleeve on the shaft provided with an indicator cooperating with said scale, spring means connected between said support and shaft, and pawl and ratchet means between said sleeve and shaft for coupling the same together.

8. In a device for testing the return torque of semaphore signals, in combination with a casing, a shaft in the casing adapted to be connected to the motor shaft of the signal, a handle on said shaft for turning the semaphore to the position to be tested, and means in the casing including a ratchet for measuring the torque when the handle is freed while the casing is held.

9. A portable torque measuring device comprising a supporting casing, a shaft journaled in said casing having both ends thereof constructed so as to be attachable to a shaft whose torque is to be determined, spring means adapted to oppose movement of the shaft with respect to the casing in one direction, and a pointer and scale for indicating such displacement of the shaft.

10. A portable torque measuring device comprising a casing, a shaft journaled in the casing, a detachably connected member on one end of the shaft adapted to be connected to the moving part whose torque is to be measured, a handle detachably connected to the other end of the shaft, means including a pawl and ratchet and a spring for opposing movement of the shaft with respect to the casing, and means for measuring such displacement of the shaft.

11. The method of determining excessive friction in the operating mechanisms of semaphore signals of the type in which the motor and connecting gearing are driven backward by the semaphore, which consists in setting the semaphore to different positions and measuring the return torque exerted by the motor shaft.

12. The method of determining the operating condition of semaphore signal operating mechanisms of a type in which the motor and connecting gearing are driven backward by the semaphore, which consists in measuring the torque exerted by the motor shaft when the semaphore is free to drop and also the torque required to be applied to the motor shaft to raise the semaphore, so as to determine the amount of friction opposing the return movement of the semaphore.

13. In a torque testing device of the character described, the combination with a casing, of a shaft supported in said casing and having both ends extending therefrom, a spring in said casing attached at one end thereto, means connecting said shaft and the other end of said spring for driving movement in one direction only and means for indicating the deformation of the spring in response to force transmitted from the shaft to the casing.

14. In a torque testing device, the combination with a shaft, a support for said shaft provided with a scale concentric with the shaft, a sleeve on the shaft provided with an indicator cooperating with said scale, spring means connected between said support and shaft, and means for adjustably fastening said sleeve and shaft together.

15. A torque testing device comprising a shaft, a support for said shaft provided with a scale concentric with the shaft, a sleeve on the shaft provided with an indicator cooperating with said scale, adjustable spring means connected between said support and shaft, and means for permitting unidirectional rotation only of said sleeve with respect to said shaft.

In testimony whereof I hereby affix my signature.

RICHARD C. LEAKE.